(12) United States Patent
Movall et al.

(10) Patent No.: US 7,069,206 B2
(45) Date of Patent: Jun. 27, 2006

(54) METHOD AND APPARATUS FOR ABSTRACTION OF PHYSICAL HARDWARE IMPLEMENTATION TO LOGICAL SOFTWARE DRIVERS

(75) Inventors: Paul Edward Movall, Rochester, MN (US); Shaun Allan Wetzstein, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 10/422,687

(22) Filed: Apr. 24, 2003

(65) Prior Publication Data

US 2004/0215439 A1   Oct. 28, 2004

(51) Int. Cl.
  G06F 9/455  (2006.01)
  G06F 3/00   (2006.01)
  G06F 9/44   (2006.01)
  G06F 9/46   (2006.01)
  G06F 13/00  (2006.01)

(52) U.S. Cl. ........................ 703/27; 719/321
(58) Field of Classification Search ............ 703/27; 719/321
  See application file for complete search history.

(56) References Cited

U.S. PATENT DOCUMENTS

| 5,265,252 A * | 11/1993 | Rawson et al. | 719/326 |
| 5,727,212 A * | 3/1998 | Dinallo | 719/321 |
| 5,815,731 A * | 9/1998 | Doyle et al. | 710/10 |
| 5,887,169 A * | 3/1999 | Lacombe | 719/311 |
| 6,023,736 A * | 2/2000 | Lambeth et al. | 710/10 |
| 6,275,893 B1 * | 8/2001 | Bonola | 710/262 |
| 6,366,656 B1 * | 4/2002 | Lee et al. | 379/198 |
| 6,618,767 B1 * | 9/2003 | Slaughter et al. | 719/321 |
| 6,633,929 B1 * | 10/2003 | Hyder et al. | 710/62 |

FOREIGN PATENT DOCUMENTS

| GB | PUPAH04-233649 | 8/1992 |
| JP | 2004-326747 | * 11/2004 |

OTHER PUBLICATIONS

Ryan J. Stein, "Synchronization in portable device drivers" ACM SIGOPS Operating Systems Review, ISSN: 0163-5980, 1998 pp. 62-69.*

* cited by examiner

Primary Examiner—Paul L. Rodriguez
Assistant Examiner—Dwin M. Craig
(74) Attorney, Agent, or Firm—Joan Pennington

(57) ABSTRACT

A method and apparatus are provided for abstraction of a physical hardware implementation to logical software drivers. An operating system kernel includes a device driver layer, an enhanced I/O abstraction layer and physical hardware implementation details layer. The physical hardware implementation details layer encapsulates hardware details for the physical hardware implementation. The enhanced I/O abstraction layer abstracts the hardware details for the device driver layer and creates unique logical I/O device structures for each embedded function in the physical hardware implementation. By using the enhanced I/O abstraction layer, device drivers maintain their independence from the physical hardware implementation. Using the enhanced I/O abstraction layer also enables a single driver with one binary image to support embedded functions spread out across multiple chip implementations, and multiple instances of an embedded function on one or multiple chips.

14 Claims, 4 Drawing Sheets

METHOD AND APPARATUS FOR ABSTRACTION OF PHYSICAL HARDWARE IMPLEMENTATION TO LOGICAL SOFTWARE DRIVERS

FIELD OF THE INVENTION

The present invention relates generally to the data processing field, and more particularly, relates to a method and apparatus for abstraction of a physical hardware implementation to logical software drivers.

DESCRIPTION OF THE RELATED ART

The basic problem is that to improve the hardware costs, the current chip designs are integrating many functions onto one physical chip. All of these devices historically have been external separate entities and the software would treat them as such.

When multiple functions become integrated into a single chip, the hardware layers are removed and direct connections are made between the functions. When the hardware layers are removed, such as a PCI bus between chips, the software layers that provide abstraction are also eliminated. A device driver for such functions provided external separate entities historically have hardcoded the hardware addresses or required the customer application to provide the hardware addresses of the registers and interrupts of the function.

With many integrated functions on one physical chip, a significant disadvantage results in that the executable for the device driver is now specific for a particular chip implementation. If a new chip is created but the functional addresses move, or the interrupt request line changes, then the device driver cannot work with the new chip. The device driver must be compiled separately, or additional external manual configuration must be provided.

The only known alternative to this problem is the multi-function PCI device. The limitations to this approach are that there can only be 8 devices in one chip and the multifunction PCI device does not work for systems on a chip where the devices and processors are on the same chip; that is there is no PCI bus between devices on the same chip.

A need exists for an improved mechanism for implementing device drivers for various hardware implementations including systems on a chip.

SUMMARY OF THE INVENTION

A principal object of the present invention is to provide a method and apparatus for abstraction of a physical hardware implementation to logical software drivers. Other important objects of the present invention are to provide such method and apparatus for abstraction of a physical hardware implementation to logical software drivers substantially without negative effect and that overcome some of the disadvantages of prior art arrangements.

In brief, a method and apparatus are provided for abstraction of a physical hardware implementation to logical software drivers. An operating system kernel includes a device driver layer, an enhanced input/output (I/O) abstraction layer and physical hardware implementation details layer. The physical hardware implementation details layer encapsulates hardware details for the physical hardware implementation. The enhanced I/O abstraction layer abstracts the hardware details for the device driver layer. The enhanced I/O abstraction layer creates unique logical I/O device structures for each embedded function in the physical hardware implementation.

In accordance with features of the invention, by using the enhanced I/O abstraction layer, the device drivers maintain their independence from the physical hardware implementation. Using the enhanced I/O abstraction layer also enables a single driver with one binary image to support embedded functions spread out across multiple chip implementations, and to support multiple instances of an embedded function on one or multiple chips.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENT

In accordance with features of the preferred embodiment, a software layer is provided that abstracts the physical hardware implementation for the device driver software. This approach can be used for any number of devices and can be used for any hardware configuration, including system on a chip implementations.

Figure 1A:
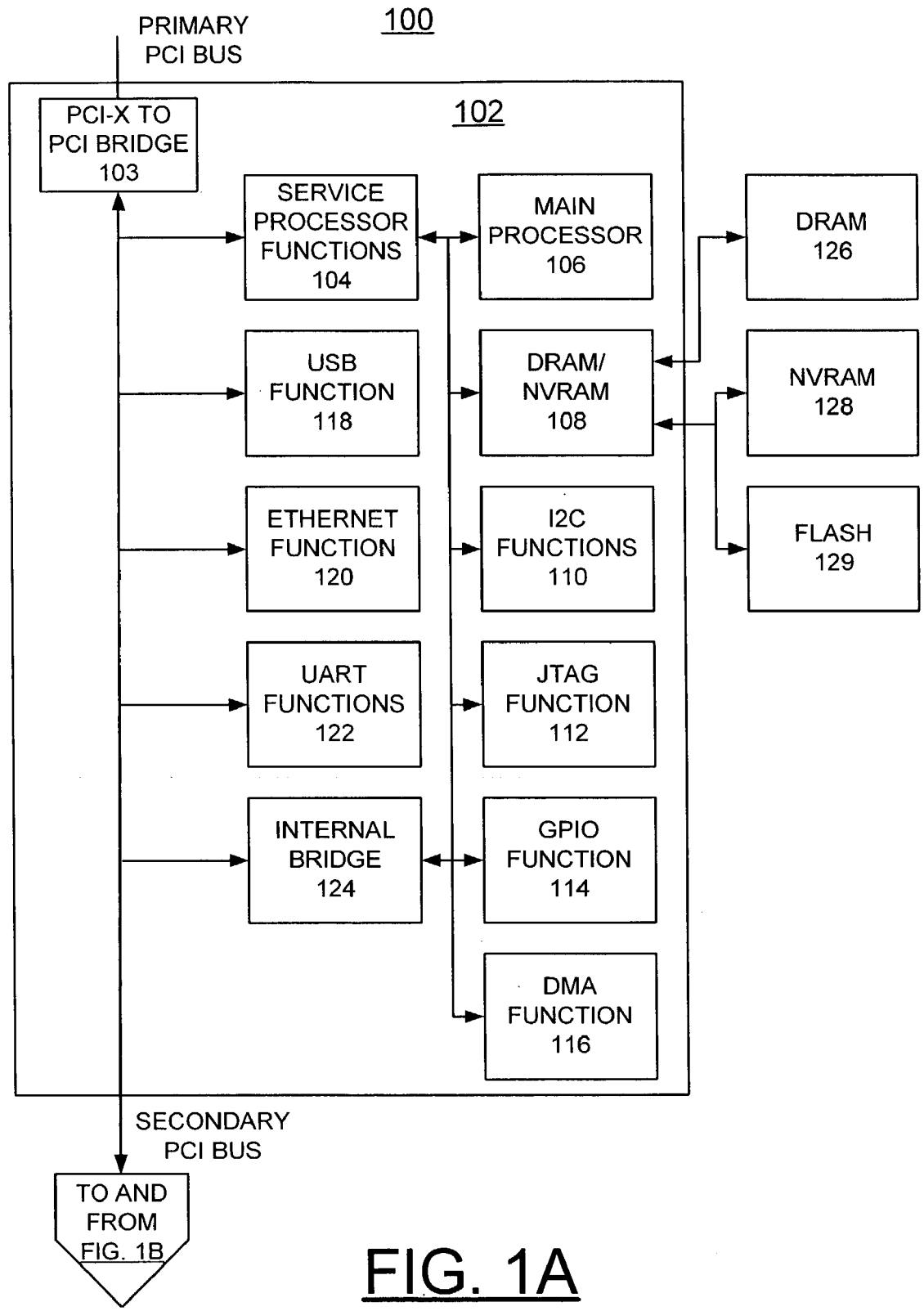
FIGS. 1A and 1B together provide a block diagram illustrating a processor system for implementing a software abstraction method in accordance with the preferred embodiment.
Figure 1B:
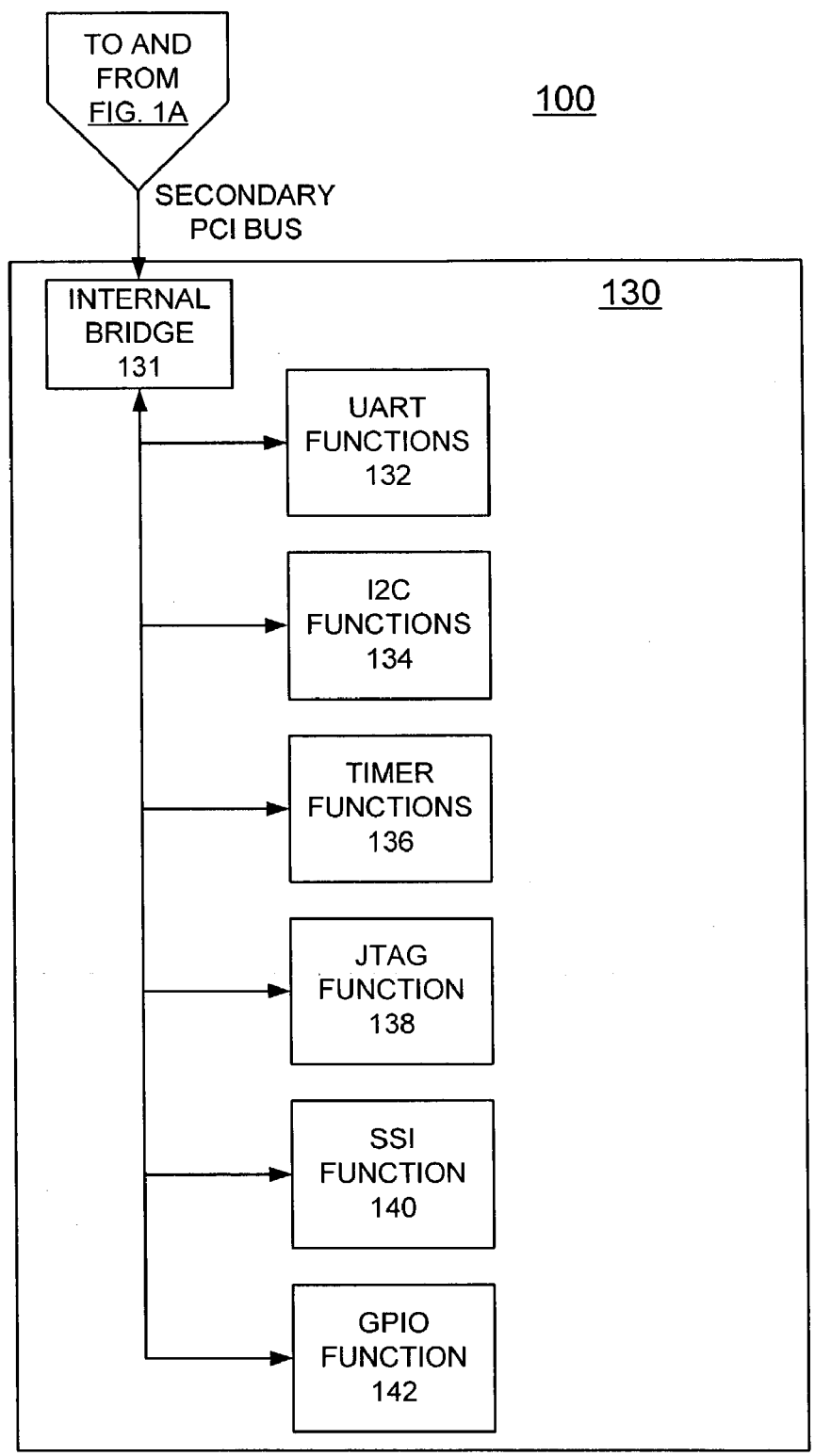

Referring now to the drawings, in FIGS. 1A and 1B there is shown a processor system generally designated by the reference character 100 for implementing a software abstraction method of the preferred embodiment. Processor system 100 includes a base processor chip 102 and an extender chip 130. Base processor chip 102 provides a system on a chip including multiple functions and extender chip 130 is a single function PCI device that provides additional functions. Base processor chip 102 includes a peripheral component interconnect extension (PCI-X) to PCI bridge 103 connecting a primary PCI bus to a secondary PCI bus that is included within the base chip 102 and connects to the extender chip 130.

Base processor chip 102 includes service processor functions 104, a main processor 106 and a dynamic random access memory (DRAM) and nonvolatile random access memory (NVRAM) 108 coupled by a local system bus. The system bus couples multiple device functions included on the base processor chip 102 to service processor functions 104 and main processor 106. These device functions include inter-integrated circuit (I2C) functions 110, a Joint Test Access Group (JTAG) function 112, a general purpose input/output (GPIO) function 114, and a direct memory access (DMA) function 116. Base processor chip 102 includes multiple functions coupled to the secondary PCI bus including a universal serial bus (USB) function 118, an Ethernet function 120, and universal asynchronous receiver transmitter (UART) functions 122. An internal bridge 124 couples the USB function 118, Ethernet function 120, and UART functions 122 from the secondary PCI bus to system bus for communication with main processor 106. Memory 108 is connected to external memory including a dynamic random access memory (DRAM) 126, a nonvolatile random access memory (NVRAM) 128, and a flash memory 129.

Extender chip 130 includes an internal bridge 124 coupled to the secondary PCI bus and a local bus coupled to multiple additional functions including UART functions 132, I2C functions 134, timer functions 136, JTAG function 138, system support interface (SSI) function 140, and GPIO function 142.

In accordance with features of the invention, an enhanced I/O abstraction layer is provided in an operating system kernel of the support processor system 100, such as an enhanced PCI support layer. With conventional PCI support, system hardware resources are dynamically configurable and the device drivers retrieve the resource assignments for their functions from the PCI support. The enhanced I/O abstraction layer of the preferred embodiment creates a separate logical I/O device structure for each of the integrated functions within base chip 102 and extended chip 130. In this manner, the device drivers can use standard interfaces to retrieve the appropriate resources for its hardware from the separate logical I/O device structures. The device driver software no longer has any direct relationship to the physical hardware implementation.

In accordance with features of the invention, the physical hardware details are encapsulated within the lowest layers of the operating system kernel of processor system 100. The enhanced I/O abstraction layer creates unique logical I/O device structures for the embedded functions.

In accordance with features of the invention, the enhanced I/O abstraction layer enables the device drivers to maintain their independence from the physical hardware implementation. Using the enhanced I/O abstraction layer allows a device driver to be reused more easily and a single driver can support functions spread out across multiple chip implementations.

It should be understood that the present invention is not limited for use with the illustrated processor system 100 or the illustrated base processor chip 102 and extender chip 130. The illustrated processor system 100 is not intended to imply architectural or functional limitations. The present invention can be used with various hardware implementations and systems and various other internal hardware devices, for example, multiple main processors, as well as other I/O bus structures rather than the illustrated PCI buses.

Figure 2:
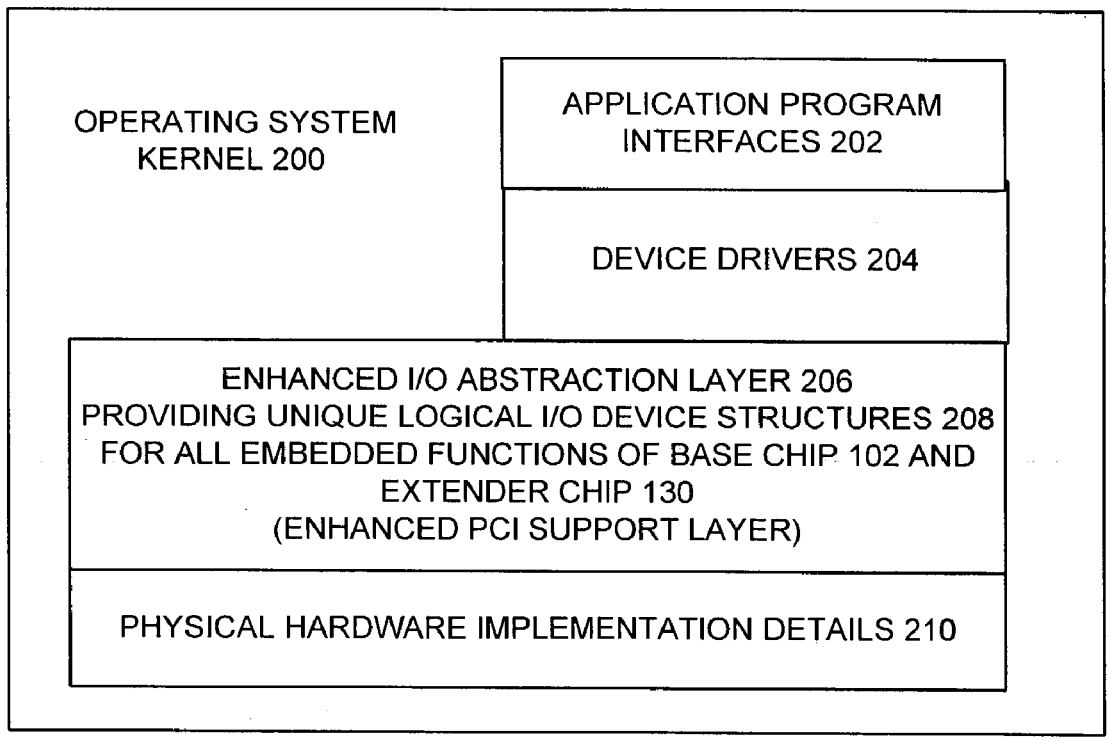
FIG. 2 is block diagram illustrating an exemplary operating system kernel that may be used in the processor system of FIGS. 1A and 1B in accordance with the preferred embodiment.

Referring now to FIG. 2, there is shown an exemplary operating system kernel 200 that may be used in the processor system 100 in accordance with the preferred embodiment. Operating system kernel 200 includes an application program interfaces layer 202 and a device drivers layer 204.

Operating system kernel 200 includes an enhanced I/O abstraction layer 206 of the preferred embodiment supporting the device drivers layer 204. The enhanced I/O abstraction layer 206 of the preferred embodiment provides unique logical I/O device structures 208 for all functions of a particular hardware implementation, such as all functions of the base chip 102 and extender chip 130. The enhanced I/O abstraction layer 206 can be implemented, for example by an enhanced PCI support layer providing unique logical I/O device structures 208 for the embedded functions of a particular hardware implementation. From the device driver's perspective, these logical I/O device structures have the same look and feel as an actual PCI device.

Operating system kernel 200 includes a physical hardware implementation details layer 210 that encapsulates physical hardware details of a particular hardware implementation. This layer 210 or portion of the operating system kernel 200 is unique per hardware implementation so adding details of all of the integrated or embedded functions within base chip 102 and extended chip 130 does not add additional hardware dependencies. The physical hardware details including details the integrated or embedded functions within base chip 102 and extended chip 130 encapsulated by layer 210 can be either hardcoded or can be based off of other configuration data available to the operating system kernel.

All of the device drivers 204 in the software implementation use the enhanced I/O abstraction layer 206 to access their functional hardware. Logical PCI device structures 208 are provided by the enhanced I/O abstraction layer 206 for the I2C functions 110, JTAG function 112, GPIO function 114, DMA function 116, USB function 118, Ethernet function 120, and UART functions 122 on the base processor chip 102 and for the UART functions 132, I2C functions 134, timer functions 136, JTAG function 138, SSI function 140, and GPIO function 142 on the extender chip 130, while a conventional PCI support does not provide any logical devices for the base chip 102 and only one logical PCI device for the extender chip 130.

Each device driver 204, when initializes, uses the same I/O interfaces provided by the enhanced I/O abstraction layer 206 to retrieve the hardware resources for its devices, independent of whether the embedded function is on the base chip 102 or extender chip 130. In this manner the device driver 204 can easily support different hardware configurations with one binary image. Using the enhanced I/O abstraction layer 206 enables a single driver 204 to support functions spread out across multiple chips, such as base chip 102, and extender chip 130.

Using the enhanced I/O abstraction layer 206 enables a single driver 204 with one binary image to support functions spread out across multiple chip implementations. A single binary image for a device driver 204 can be used for similar devices, whether these similar devices are embedded on the base chip 102 or another chip, such as extender chip 130. A single binary image for a device driver 204 can be used for multiple instances of a device on one chip, such as base chip 102, or multiple chips 102, 130.

For example, three drivers (I2C, JTAG, and GPIO) having functions on both the base chip 102 and extender chip 130 have been implemented having only one device driver 204. Other device functions, such as timer and UART functions, have compatible device driver implementations with totally different hardware implementations. The I2C and JTAG also have compatible device driver implementations with totally different hardware implementations. The I2C and JTAG drivers 204 have one binary image across the multiple different chip hardware implementations.

Figure 3:
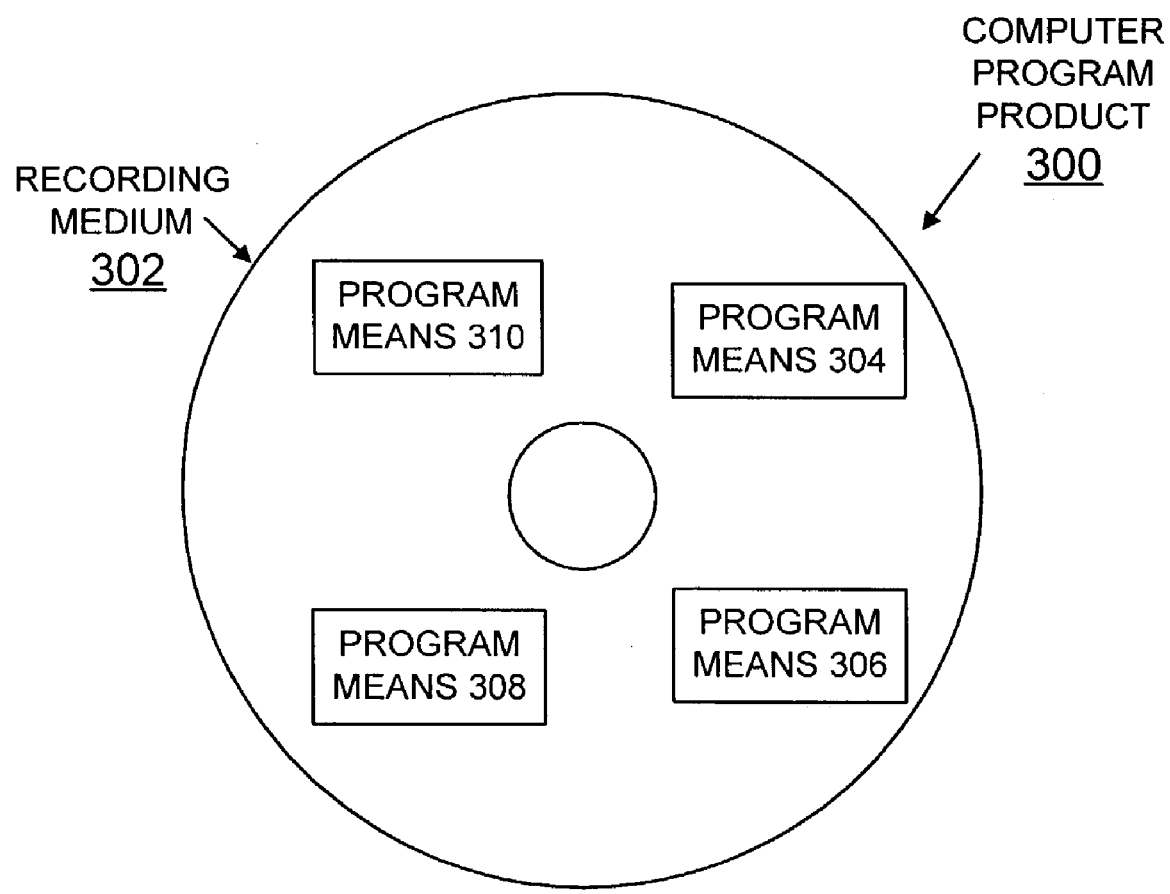
FIG. 3 is a block diagram illustrating a computer program product in accordance with the preferred embodiment.

Referring now to FIG. 3, an article of manufacture or a computer program product 300 of the invention is illustrated. The computer program product 300 includes a recording medium 302, such as, a floppy disk, a high capacity read only memory in the form of an optically read compact disk or CD-ROM, a tape, a transmission type media such as a digital or analog communications link, or a similar computer program product. Recording medium 302 stores program means 304, 306, 308, 310 on the medium 302 for carrying out the methods for abstraction of a physical hardware implementation to logical software drivers of the preferred embodiment in the system 100 of FIGS. 1A and 1B.

A sequence of program instructions or a logical assembly of one or more interrelated modules defined by the recorded program means 304, 306, 308, 310, provide an operating system kernel 200 including the enhanced I/O abstraction layer 206 of the preferred embodiment.

While the present invention has been described with reference to the details of the embodiments of the invention shown in the drawing, these details are not intended to limit the scope of the invention as claimed in the appended claims.

What is claimed is:

1. Apparatus for abstraction of a physical hardware implementation to logical software drivers comprising:
   an operating system kernel including a device drivers layer, an enhanced I/O abstraction layer and a physical hardware implementation details layer;
   said physical hardware implementation details layer encapsulating hardware details for the physical hardware implementation;
   said enhanced I/O abstraction layer abstracting hardware details for said device drivers layer;
   said enhanced I/O abstraction layer creating a unique logical I/O device structure for each embedded function in the physical hardware implementation;
   the physical hardware implementation includes a base chip and an extender chip, each chip including multiple embedded functions; and said enhanced I/O abstraction layer abstracting hardware details for said device drivers layer for said embedded functions of both said base chip and said extender chip.

2. Apparatus for abstraction of a physical hardware implementation to logical software drivers as recited in claim 1 further includes an application program interface layer supported by said device driver layer.

3. Apparatus for abstraction of a physical hardware implementation to logical software drivers as recited in claim 1 wherein said enhanced I/O abstraction layer accesses said physical hardware implementation details layer for abstracting hardware details for said device drivers layer and said device drivers layer being independent of the physical hardware implementation.

4. Apparatus for abstraction of a physical hardware implementation to logical software drivers as recited in claim 1 wherein said physical hardware implementation details layer encapsulates unique hardware details for each different physical hardware implementation.

5. Apparatus for abstraction of a physical hardware implementation to logical software drivers as recited in claim 4 wherein said enhanced I/O abstraction layer enables a single binary image for a device driver of said device drivers layer to be used for multiple different physical hardware implementations.

6. Apparatus for abstraction of a physical hardware implementation to logical software drivers as recited in claim 1 wherein multiple embedded functions are included in a base chip and an extender chip of the physical hardware implementation; and said enhanced I/O abstraction layer enables a single binary image for a device driver of said device drivers layer to be used for selected embedded functions; said selected embedded functions included on said base chip or said extender chip.

7. Apparatus for abstraction of a physical hardware implementation to logical software drivers as recited in claim 1 wherein said enhanced I/O abstraction layer is an enhanced PCI support layer.

8. A method for abstraction of a physical hardware implementation to logical software drivers, said method comprising the steps of:
   providing an operating system kernel including a device drivers layer, an enhanced I/O abstraction layer and a physical hardware implementation details layer;
   encapsulating hardware details for the physical hardware implementation using said physical hardware implementation details layer;
   abstracting hardware details for said device drivers layer using said enhanced I/O abstraction layer;
   creating a unique logical I/O device structure for each embedded function in the physical hardware implementation using said enhanced I/O abstraction layer; and
   the physical hardware implementation includes a base chip and an extender chip, each chip including multiple embedded functions; and includes the step of abstracting hardware details for said device drivers layer for said embedded functions of both said base chip and said extender chip using said enhanced I/O abstraction layer.

9. A method for abstraction of a physical hardware implementation to logical software drivers as recited in claim 8 includes the step of providing said operating system kernel with an application program interface layer supported by said device driver layer.

10. A method for abstraction of a physical hardware implementation to logical software drivers as recited in claim 8 wherein the step of encapsulating hardware details for the physical hardware implementation using said physical hardware implementation details layer includes the step of encapsulates unique hardware details for each different physical hardware implementation.

11. A method for abstraction of a physical hardware implementation to logical software drivers as recited in claim 10 further includes the step of providing a single binary image for a device driver of said device drivers layer to be used for multiple different physical hardware implementations.

12. A method for abstraction of a physical hardware implementation to logical software drivers as recited in claim 8 further includes the step of providing a single binary image for a device driver of said device drivers layer to be used for selected embedded functions; said selected embedded functions included on said base chip or said extender chip.

13. A method for abstraction of a physical hardware implementation to logical software drivers as recited in claim 8 wherein the step of abstracting hardware details for said device drivers layer using said enhanced I/O abstraction layer includes enabling a single binary image for a device driver of said device drivers layer to be used for selected embedded functions; said selected embedded functions included on said base chip or said extender chip, said enhanced I/O abstraction layer.

14. A method for abstraction of a physical hardware implementation to logical software drivers as recited in claim 8 wherein said enhanced I/O abstraction layer is an enhanced PCI support layer.

* * * * *